United States Patent
Shteynberg

(10) Patent No.: US 6,195,273 B1
(45) Date of Patent: Feb. 27, 2001

(54) CONVERTER WITH CONTINUOUS CURRENT FLOWING THROUGH SECONDARY WINDINGS

(75) Inventor: Anatoly Shteynberg, San Jose, CA (US)

(73) Assignee: Switch Power, Inc., Campbell, CA (US)

(*) Notice: Subject to any disclaimer, the term of this patent is extended or adjusted under 35 U.S.C. 154(b) by 0 days.

(21) Appl. No.: 09/470,856

(22) Filed: Dec. 23, 1999

(51) Int. Cl.[7] ................................................. H02M 3/335
(52) U.S. Cl. ................................................................. 363/26
(58) Field of Search ............................... 363/24, 25, 260, 363/134

(56) References Cited

U.S. PATENT DOCUMENTS 5,684,680 * 11/1997 Tahhan et al. ........................ 363/26
6,021,052 * 2/2000 Unger et al. ......................... 363/26

* cited by examiner

*Primary Examiner*—Shawn Riley
(74) *Attorney, Agent, or Firm*—Flehr Hohbach Test Albritton & Herbert LLP

(57) ABSTRACT

The input side of a DC:DC converter emulates current fed topologies and replaces an active switch and associated components with a passive inductor, coupled between Vin and upper nodes of the primary transformer windings, that smoothes input current. Several output side topologies are disclosed that may be used with any input side configuration, and require no output snubbers. The output topologies use non-center-tapped secondary windings that are utilized 100% of the time. The output topologies advantageously use series-coupled capacitors, which configuration distributes voltage stress. The topologies advantageously provide two output voltages, Vo1 and Vo2≈Vo1, or Vo2≈−Vo1. The snubber-less output side topologies provide very low EMI content waveforms that may be switched at relatively high frequencies.

20 Claims, 3 Drawing Sheets

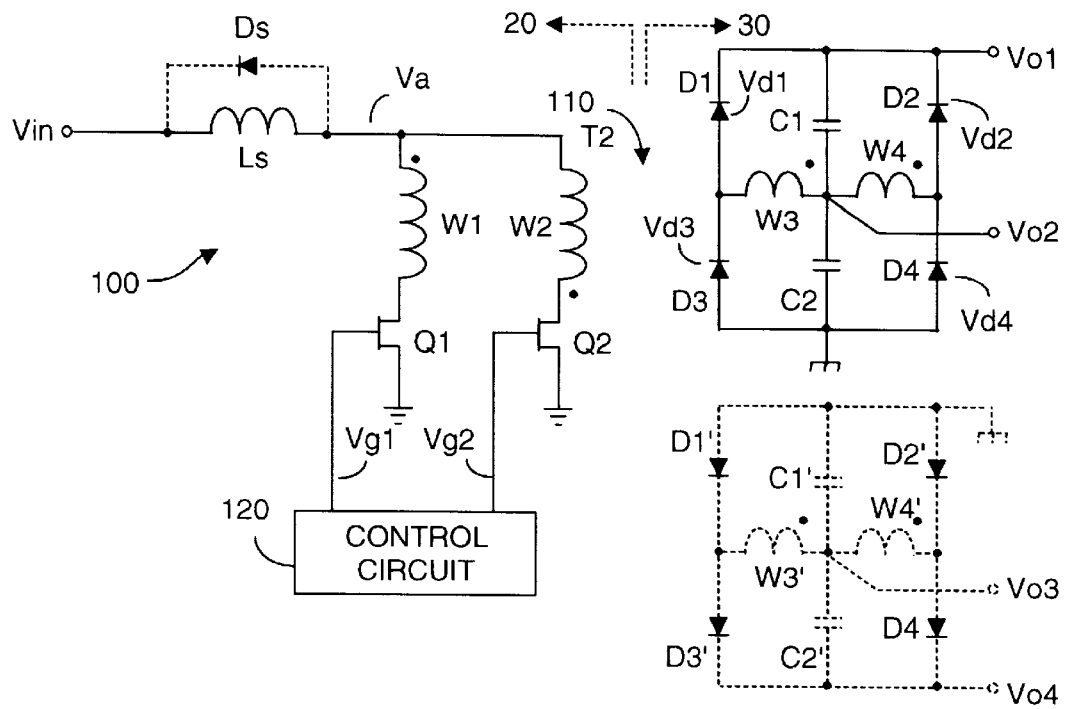
FIG. 2A
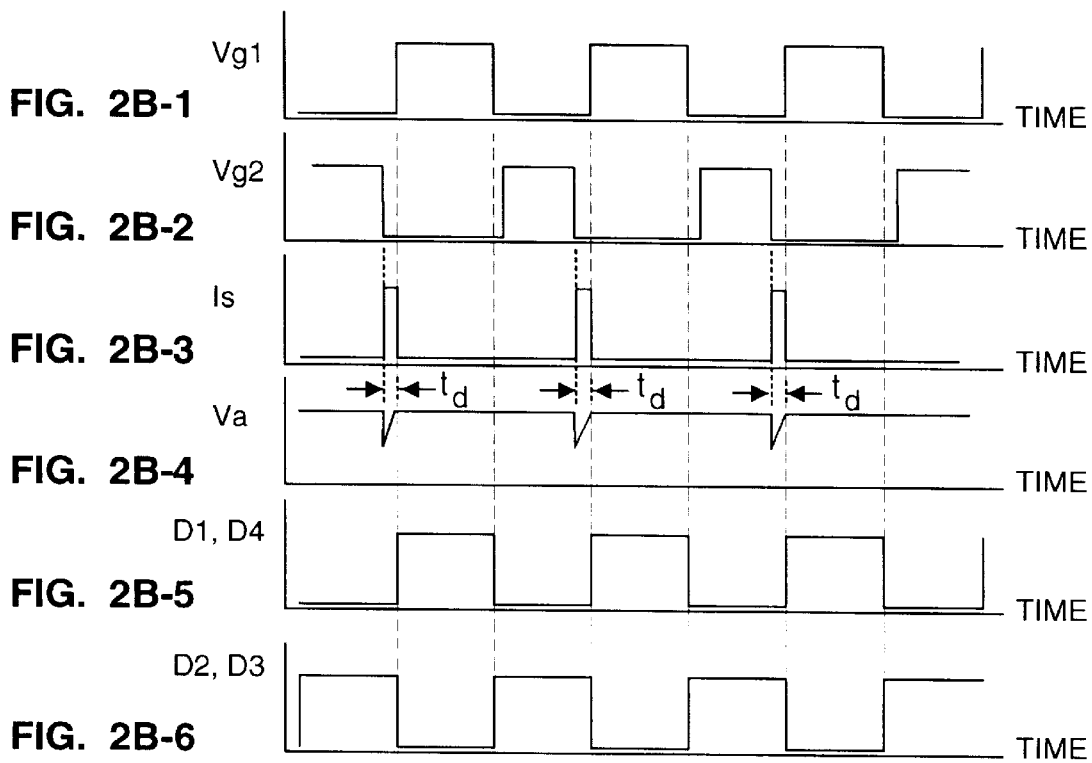
FIG. 2B-1
FIG. 2B-2
FIG. 2B-3
FIG. 2B-4
FIG. 2B-5
FIG. 2B-6

CONVERTER WITH CONTINUOUS CURRENT FLOWING THROUGH SECONDARY WINDINGS

FIELD OF THE INVENTION

The present invention relates generally to DC:DC power converters, and more specifically to providing a converter topology that improves efficiency, reduces EMI and optionally provides a second output voltage that is half the main output voltage.

BACKGROUND OF THE INVENTION

Circuitry to implement DC:DC converters is known in the art. Such circuits receive an input-side DC voltage that is sampled or chopped and transformer-coupled to an output side. On the output side, the waveform is rectified and filtered to provide a regulated output voltage that may be greater than or less than the input voltage. Feedback from output to input can be used to regulate the sampling duty cycle or frequency to provide an acceptably efficient DC:DC converter in a small form factor.

FIG. 1A depicts a so-called voltage-fed push-pull DC:DC converter 10, according to the prior art, has having an input or primary side 20 and an output or secondary side 30. In input and output sides are essentially demarked by a transformer T1 having input windings W1, W2, and output windings W3-1, W3-2 and W4-1, W4-2. Preferably windings W1 and W2 are identical and center tapped windings W3-1, W3-2, W4-1, W4-2 are identical.

The input side 20 of the converter is coupled to a source of DC potential Vin that in some applications may be pre-regulated with a pre-regulator 40 whose output potential is controlled within a known tolerance. In other applications, preregulation is omitted and feedback 50 is used to modulate pulse width on drive signals output from a control circuit 60, to regulate the output voltage(s), shown here as V01, V02.

In FIG. 1A, input voltage, which may be the output potential from pre-regulator 30, is sampled or chopped using push-pull switching transistors Q1, Q2 and respective transformer T1 primary windings W1, W2. Control circuit 50 provides complementary drive signals to the input leads of Q1, Q2 such that when Q1 is on, Q2 is off, and vice versa. Although Q1 and Q2 are shown as switching an end of primary windings W1, W2 to ground potential, it is understood that ground potential implies a stable potential. Stated differently, if desired a potential other than 0 V DC might instead be switchably coupled to an end of primary windings W1 and W2. This understanding that ground is simply a convenient reference potential shall apply throughout this disclosure.

On the converter output side 30, center-tapped secondaries W3-1, W3-2, and W4-1, W4-2 of transformer T1 step-up or step-down the chopped waveforms, which are rectified by diodes D1, D2 and inductor L1-capacitor C1, and by diodes D3, D4 and inductor L2-capacitor C2. As described below, in an attempt to reduce voltage stress on the output side rectifier components and to reduce EMI it is customary to insert snubbers, typically a series-coupled resistor-capacitor, across each output winding of T1.

Feedback loop 50 can sample the DC output voltages, here shown as Vo1, Vo2, to control the pulse width (or duty cycle) and/or frequency of the Q1, Q2 drive signals generated by control circuit 60. The secondary windings may output different magnitudes Vo1, Vo2 and the number of windings may be greater or less than two.

As will be described in detail shortly, there are several recognized drawbacks with the configuration of FIG. 1A, including difficulty in implementing transformer T1, under utilization of the secondary transformer windings, the essentially unbalanced state of the magnetic flux in the transformer, and the need to employ snubbers to help protect against voltage stress and reduce EMI, at the cost of conversion efficiency. A further drawback to the configuration of FIG. 1A is the necessity to ensure that Q1 and Q2 are never simultaneously in the on-state, a condition that could result in potentially destructive inrush current levels. High current transients during any overlap between transition states of Q1, Q2 gives rise to high magnitude of electromagnetic (EMI) radiation, which can require expensive shielding of the DC:DC converter. Ensuring that Q1 and Q2 are not simultaneously on can add to the complexity of control circuit 60.

In the push-pull configuration of FIG. 1A (and indeed FIG. 1B as well) careful flux matching is required for transformer T1, especially balancing between windings W1 and W2 and switches Q1, Q1. On the output side, each of D1 and D2, and D3 and D4 deliver the same amount of energy to their respective loads (not shown). This in turn dictates good symmetry between center-tapped windings W3-1 and W3-2, and W4-1 and W4-2. Such symmetry can prevent or at least greatly reduce the presence of harmonic energy at half the switching frequency of Q1 or Q2. Understandably, implementing a well designed voltage-fed pushpull DC:DC converter can be challenging.

Fabricating a perfectly symmetrical transformer T1 is difficult in practice. But even if the T1 windings are perfectly balanced, the secondary windings are never fully utilized in the sense that these windings do not conduct current all of the time. For example, if D1 is conducting, winding W3-1 is used (e.g., conducts current), but during this time diode D2 is not conducting and winding W3-2 is not used. By the same token, if D2 is conducting, winding W3-2 is used, but winding W3-1 conducts no current and is not used. (The same statements hold true for windings W4-1, W4-2, if they are present).

This under utilization of the secondary transformer windings presents several problems. During the time a secondary transformer winding is not being used, the winding portion coupled to the associated (reverse-biased) diode is essentially floating, e.g., not clamped to a low impedance. As a result voltage spikes can be generated, which give rise to overshoot and undershoot ringing and EMI, which can be unacceptable in many applications. Further, the voltage spikes can overstress the rectifier diode, inductor, and output capacitors, requiring higher voltage breakdown components to be used, thus increasing cost and perhaps size of the circuitry.

Those skilled in the art will appreciate that coupling an R-C snubber across the transformer secondary windings presents a lower AC-impedance that can dampen the magnitude of otherwise dangerous voltage spikes, thus reducing EMI. Unfortunately, the snubbers dissipates inductance leakage energy, and can reduce DC:DC conversion by up to 5% or so. However where EMI and over-voltage stress present critical constraints, prior art configuration 1A will require snubbers. In some instances, it may even be necessary to reduce switching speed in prior art converters in an attempt to control voltage stress and EMI generation. If the snubbers were eliminated, conversion efficiency would increase by several percent but the magnitude of the overshoot/undershoot could be 100% of the voltage level being switched. Thus if Vo1 were 50 VDC, capacitor C1 would have to be rated at at least 100 VDC breakdown. If it were somehow possible to more fully or more efficiently utilize transformer 40, it might be possible to use a smaller transformer, e.g., a lighter and less expensive transformer.

FIG. 1B depicts a so-called current-input topology for a push-pull DC:DC converter system 80. Components similarly numbered as in FIG. 1A may generally be the same as those described with respect to converter system 10. In this configuration, Vin (which may be pre-regulated) is switched via Qo (under command of control circuit 90) to lowpass filter Lo-Co. The filtered Vin is then switchingly coupled to T1 primary windings W1, W2 by switches Q1, Q2 under command of control circuit 90. Since input switch Qo is sometimes open, a diode Do is included to ensure a current path for Lo when Qo is open. In the configuration of FIG. 1B, drive signals to 01 and Q2 are never on simultaneously.

A current-fed push-pull topology such as shown in FIG. 1B can offer advantages over the voltage-fed push-pull topology of FIG. 1A. In a current-fed push-pull topology the transformer symmetry constraints are somewhat eased because input current is stored and somewhat averaged by inductor Lo, which can reduce the AC component in this current. In general, current-fed topology tends to reduce ripple in the output voltages Vo1, Vo2. Further, current-fed topologies typically utilize overlapping drive signals to switches Q1, Q2, as simultaneously on-switches cannot directly draw excessive inrush currents from pre-regulator 30 or the Vin power source. Nonetheless, even the current-fed topology of FIG. 1B can require snubbers, and suffers from the same under utilization of the T1 secondary windings.

Thus, there is a need for a DC: DC converter topology that, on the input-side, can provide the advantages of current-fed topology. On the output-side, preferably such a topology should improve transformer efficiency and utilization. Without requiring snubbers, the overall topology should reduce EMI and voltage stress, improve operating efficiency and performance, yet be realizable using a less expensive and smaller transformer. Further, output side topology should provide a bonus output voltage that preferably is about half of the main output voltage.

The present invention provides such a DC:DC converter topology.

SUMMARY OF THE INVENTION

The present invention provides input side and output side topologies for a DC:DC converter whose input side may be push-pull, feed forward, or any other configuration that provides an AC-output signal.

In a first embodiment, an input-side current-fed emulating configuration is provided for a DC:DC converter. On the input side, an inductor coupled in parallel with a free wheeling diode is coupled in series between input voltage Vin and the input to the converter primary transformer windings. A MOSFET or other switch is coupled in series with each push-pull primary winding and a common reference potential node in the converter, which is typically ground. These switches may or may not overlap in their on-times. If there is no on-time overlap, the free wheeling diode will maintain an input current necessary to support the output DC voltage level during switching deadtimes. (This diode may be eliminated if the switches operate with overlapping on-time, such as is common for current-fed push-pull topology.) Advantageously, the inductor-diode input configuration substantially eliminates input-side current spikes and reduces inrush current. The resultant configuration provides the advantages of a current-fed input while eliminating the input switch, and may typically be operated without an input voltage pre-regulator.

In a second embodiment, on the output side of a DC:DC converter (current-fed, voltage-fed, push-pull, feed forward, or other configuration), the present invention provides a topology that makes full-cycle (100%) utilization of the secondary windings, which need not be center-tapped, and can be smaller and less expensive than prior art transformers. The full-cycle utilization results in reduced EMI and voltage stress such that prior art snubbers may be eliminated, thus gaining 5% or so conversion efficiency. As a bonus, a second voltage (Vo2) is automatically available that is substantially 50% of the main output voltage (Vo1). this configuration, the output-side topology may be defined as having four corner nodes and an internal node. The transformer secondary windings are series coupled between the first and third nodes, with the series connection between the transformers defining the internal node, which is the Vo2 node (Vo2≈0.5Vo1). A first capacitor is coupled between the internal node and the second node, which is the Vo1 node. A second capacitor is coupled between the internal node and the four node, which is ground. A diode is connected from each of the first and third nodes to the second node, which is the Vo1 node, and a diode is connected from the fourth (ground) node to each of the first and third nodes. The capacitors are advantageously series-coupled, which reduces and distributes the voltage stress by half, which means lower voltage rated capacitors may be used.

In another embodiment, useable with any type of input topology, output voltages of Vo1 and Vo2≈–Vo1 are provided, making full utilization of the secondary transformer windings. This configuration reduces EMI and voltage stress such that snubbers may be eliminated. Two secondary windings are coupled in series, their junction being grounded. Two typically equal value series-coupled capacitors are provided, their junction being grounded. Each end of the two windings is coupled to two opposite polarity diodes and thence to a free end of a capacitor, at which Vo1 and Vo2 are available. Again, the two capacitors are advantageously series-coupled, which reduces and distributes stress voltage.

The current-fed emulating input side embodiment may be used or not used with either of the secondary side embodiments of the present invention. Alternatively, either of the secondary side embodiments may be used in a DC:DC converter having other than the current-fed emulating input side configuration.

Other features and advantages of the invention will appear from the following description in which the preferred embodiments have been set forth in detail, in conjunction with the accompanying drawings.

BRIEF DESCRIPTION OF THE DRAWINGS

FIG. 2A depicts a preferred embodiment of the present invention providing input-side current-feed emulation, and providing output-side improved transformer utilization;

FIGS. 2B-1 and 2B-2 depict control signals for switches Q1 and Q2 in the embodiment of FIG. 2A, according to the present invention;

FIGS. 2B-3 depicts current through diode Ds in the embodiment of FIG. 2A, according to the present invention;

FIGS. 2B-4 depicts potential at node Va in the embodiment of FIG. 2A, according to the present invention;

FIGS. 2B-5 and 2B-6 depict voltages across rectifier diodes D1, D4, and D2, D3 respectively in the embodiment of FIG. 2A, according to the present invention;

FIG. 3 depicts an alternative embodiment of the present invention in which the input side is push-pull or feedforward or otherwise, and the output side configuration is a half-bridge topology.

DETAILED DESCRIPTION OF THE PREFERRED EMBODIMENT

Figure 1A:
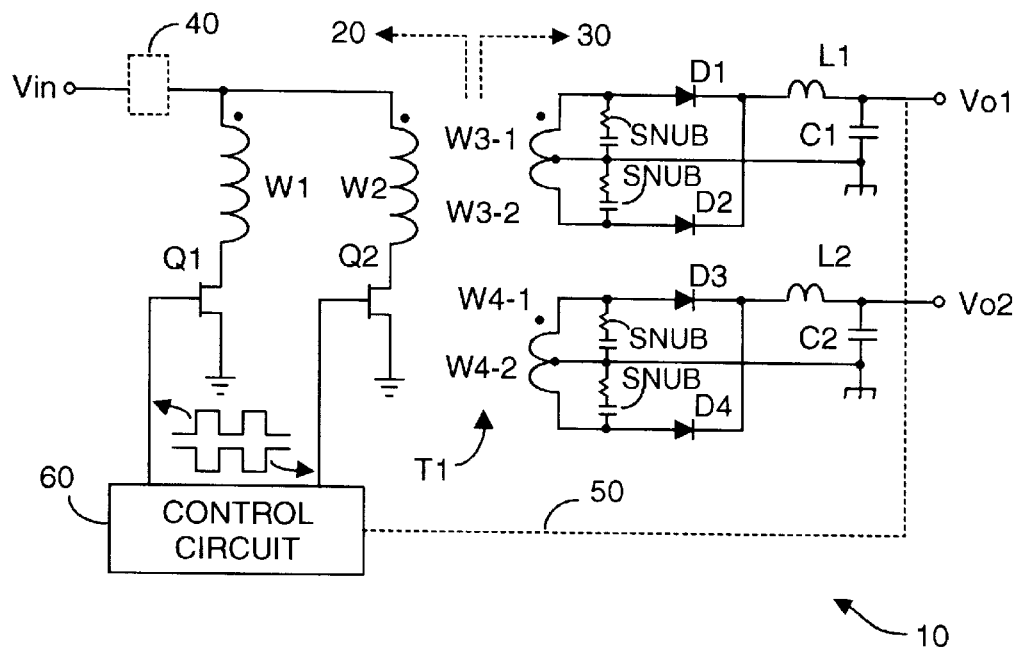
FIG. 1A depicts a voltage-fed push-pull DC:DC converter circuit, according to the prior art.
Figure 1B:
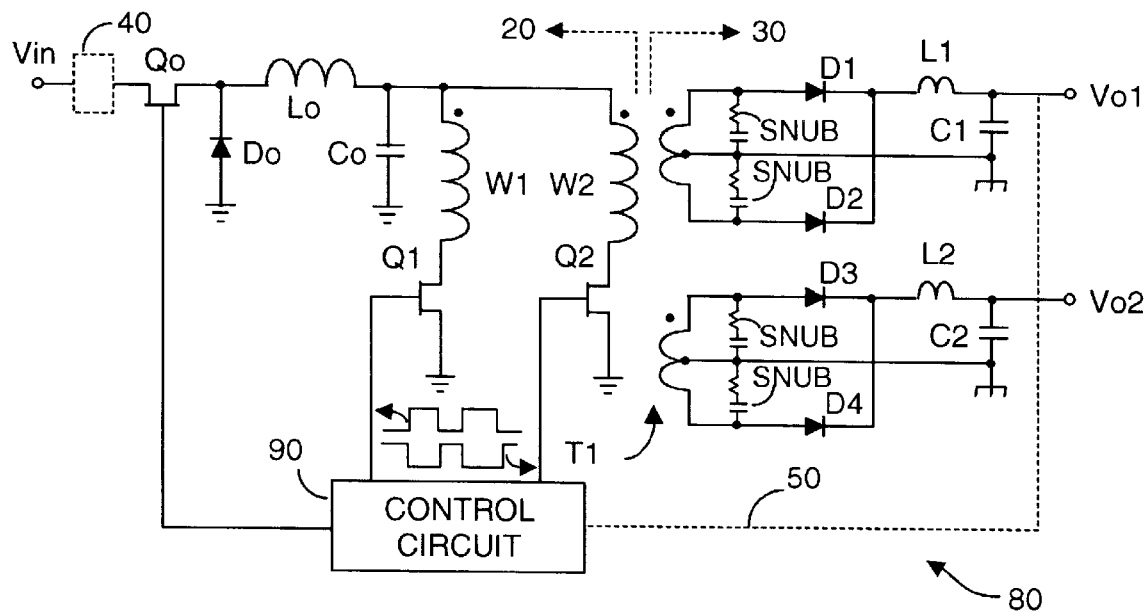
FIG. 1B depicts a current-fed push-pull DC:DC converter circuit, according to the prior art.

FIG. 2A depicts a preferred embodiment that includes both the first and second aspects of the present invention, push-pull DC:DC converter system 100. System 100 has a Vin input node coupled to a source of operating potential Vin, and has two output nodes, Vo1 outputting potential Vo1, and, essentially as a bonus, Vo2 outputting potential Vo2≈0.5 Vo1. Note in FIG. 2A that no output snubbers are required, and that output capacitors are series-coupled, which distributes voltage stress evenly over each pair of series-coupled capacitors.

Input side 20 of system 100 preferably includes a series inductor Ls coupled between the Vin node and the upper node (Va) of primary windings W1, W2 of transformer T2.

Transformer primary windings W1 and W2 are coupled respectively to switches Q1, Q2, which in practice may be MOS-type devices. Q1 and Q2 are commanded to switch on and off by respective signals Vg1, Vg2 output from a control circuit 120. FIG. 2A shows system 100 as including a common fixed potential input side node that is ground, e.g., 0 VDC and a common fixed potential output side node that may but need not also be ground. Commonly the output side of system 100 floats with respect to input side ground. However it is understood that "ground" shall refer to a fixed level potential, typically 0 VDC, or some other fixed potential.

As shown by waveforms Vg1, Vg2 in FIGS. 2B-1, 2B-2, and 2B-3, these command signals preferably define a common deadtime td, during which neither Q1 nor Q2 is turned on. Alternatively, Vg1 and Vg2 could overlap during their on times such that there is no deadtime.

In the preferred embodiment, Vg1 and Vg2 will define a deadtime $T_d$, as this configuration advantageously avoids efficiency loss that occurs if the primary windings of transformer T2 are short circuited. Such a condition can result in switches Q1 and Q2 being simultaneously on, and can include high inrush currents, current spiking, and resultant large EMI generation. In a switching embodiment in which $t_d \neq 0$, diode Ds is parallel-coupled across inductor Ls to help maintain input current. In FIG. 2A, Ds is shown coupled to Ls with a polarity that assumes Vin>0.

Components Ds and Ls are selected to ensure that the input current level maintained during $t_d$ intervals is sufficient to support the total output current delivered at Vo1 and Vo2. Inductance of Ls is determined by the desired amount of output current ripple, a larger Ls resulting in decreased current ripple but requiring a larger and bulkier inductor.

Prior art current-fed topologies must enforce overlap in the input drive signals to switches Q1 and Q2. By contrast, the present invention provides a currentfed topology without having to enforce Q1, Q2 drive overlap, e.g., the topology will function properly whether or not Q1 and Q2 overlap in their drive signals. If the present invention, if Q1, Q2 drive on-time overlap occurs, a current path through Ls will always be present, and diode Ds may be dispensed with.

Referring to FIG. 2B-4, the potential at node Va during deadtime intervals $t_d$ has a rapid negative-going component, and a positive-going ramp recovery component. This relatively well behaved Va transient substantially if not completely eliminates current spiking, and permits charging output capacitors C1, C2 without associated substantial inrush current.

It is useful to compare the input side of FIG. 2A with the input side of the prior art voltage-fed configuration of FIG. 1A. In FIG. 2A, preferably input pre-regulator 30 may be omitted, especially if the tolerance on Vin level is perhaps ±5%. Another difference is that in FIG. 2A, Ls (and optionally Ds) are inserted in series between the Vin node and the Va node. Advantageously, if Ds is included, drive signals Vg1, Vg2 in FIG. 2A need not have a 50.0% duty cycle, 180.0° phase shift requirement.

Looking now to output side 30 of system 100 in FIG. 2A, several changes are apparent with respect to the output side of system 10 as shown in prior art FIG. 1A. Most advantageously, secondary windings W3, W4 are no longer center-tapped, which can simply manufacture of transformer T2, especially with respect to maintaining tight tolerances between primary winding W1 and secondary winding W3, and primary winding W2 and secondary winding W4.

Recall that in prior art topologies, the secondary windings are utilized half of the time, which means 50% of the time one end of a secondary is floating at high impedance. To combat the resultant EMI and voltage ringing (which can be 100% of the switched voltage), prior art DC:DC converters use snubbers, whose energy dissipation imposes an efficiency penalty of perhaps 5% into the DC:DC conversion.

By contrast, the present invention makes full utilization of the secondary windings, e.g., each secondary transformer winding conducts current flow 100% of the time (contrasted to 50% utilization in prior art configurations), which substantially increases transformer magnetic flux utilization and efficiency. Typically the output side topology of FIG. 2A results in an overall improvement in efficiency of perhaps 5% to 10% compared to prior art configurations. Note too in FIG. 2A that the secondary windings no longer require center-tapping, which simplifies transformer fabrication, reduces manufacturing costs, and can result in a more compact transformer that uses less copper wire.

As seen in FIG. 2A, each secondary winding is always coupled to a low impedance, e.g., an output capacitor or ground, and is never floating. Essentially the output capacitors clamp potential at the secondary windings, imposing a DC level across the winding. The non-floating characteristic of the secondary transformer windings substantially reduces both EMI and voltage stress, without having to use snubbers. Essentially energy associated with leakage inductance that in the prior art would give rise to substantially overshoot and undershoot (absent snubbers), is instead recycled into the output Vo1 or Vo2 node, thus enhancing conversion efficiency. The output switched waveform is substantially clean in the present invention, and overshoot is on the order of a few percent of switching voltage, even though no snubbers are used. By eliminating snubbers and their power dissipation, the present invention regains the 5% loss in operating efficiency that prior art configurations must sacrifice.

The configuration of FIG. 2A provides other advantages as well. Capacitors C1 and C2 are series-coupled and their respective breakdown voltages will combine. Stated differently, the topology of FIG. 2A permits each of C1 and C2, or C1', C2' to have a smaller breakdown voltage than is permitted in prior art output topologies. By way of example, in FIG. 2A, if Vo1 is 70 V, each capacitor C1, C2 sees only 35 V and may safely be implemented using capacitors rated at 50 V breakdown voltage. But in a prior art configuration, if Vo1 is 70 V, each capacitor would have to standoff 140 VDC, which might dictate use of bulkier and more expensive 200 VDC capacitors. Yet another advantage is the creation of a second voltage output Vo2 (Vo2≈0.5·Vo1), essentially as a bonus byproduct of the topology.

DC:DC converter power losses are proportional to $0.5 \cdot f \cdot CV^2$, where f is switching frequency, C is capacitance, and V is peak voltage seen by the capacitor. The present invention advantageously reduces peak voltage V to a few percent over the switching voltage, as contrasted to 100% over the switching voltage, in the prior art. Thus, by reducing $CV^2$ in the above function, it follows that operating frequency f may be increased, without increasing losses. In practice, the present invention can operate efficiently at high switching speed (e.g., 1.5 MHz or higher) without generating substantial EMI or over-voltage exceeding a few percent of switching voltage, without using snubbers. The resultant switched waveform is very clean, with minimal EMI or voltage stress, again without recourse to snubbers. Further, higher switching frequency can ease rectification requirements for the DC:DC converter output voltage(s).

In FIG. 2A, secondary transformer windings W3-1, W3-2 (and W4-1, W4-2) are preferably substantially identical, which in practice means their specification tolerances preferably agree within about ±5% or better. Similarly, it is preferred that capacitors C1 and C2 are substantially identical and that diodes D1, D2, D3, D4 are each substantially identical. However, the present invention will function with a mismatch in transformer windings, and/or capacitor characteristics, and/or rectifier diode characteristics exceeding perhaps about ±5%, without decrease in performance efficiency or increase in EMI.

FIGS. 2B-5 and 2B-6 depicts voltage waveforms across rectifier diodes D2,D3 and D1,D4. Using the topology shown in FIG. 2A, when diodes D2, D3 are on, Vo1 appears across the series-coupled W3 and W4 windings, both of which are utilized. Further, approximately 50% Vo1 appears at the center node, which defines the Vo2 output voltage node. Understandably if windings W3 and W4 have the same number of turns, and similarly voltage drops occur across diodes D2, D3, then Vo2≈0.5 Vo1. Magnitudes of C1, C2 will typically be equal but it suffices if capacitor magnitudes are sufficient to adequately reduce output voltage ripple. It will be appreciated that Vo2 is essentially a bonus output that arises advantageously from the series-coupled nature of the output topology in FIG. 2A. When diodes D2, D3 are off, diodes D1, D4 are on. Again, Vo1 appears across the series-coupled N3 and W4 windings, both of which are utilized.

It will also be appreciated that multiple additional output potentials, including negative output potentials, may be achieved by adding additional matched secondary windings. For example, shown in phantom in FIG. 2A are optional additional components outputting two negative potentials, Vo4, and Vo3≈0.5 Vo4.

Figure 2C:
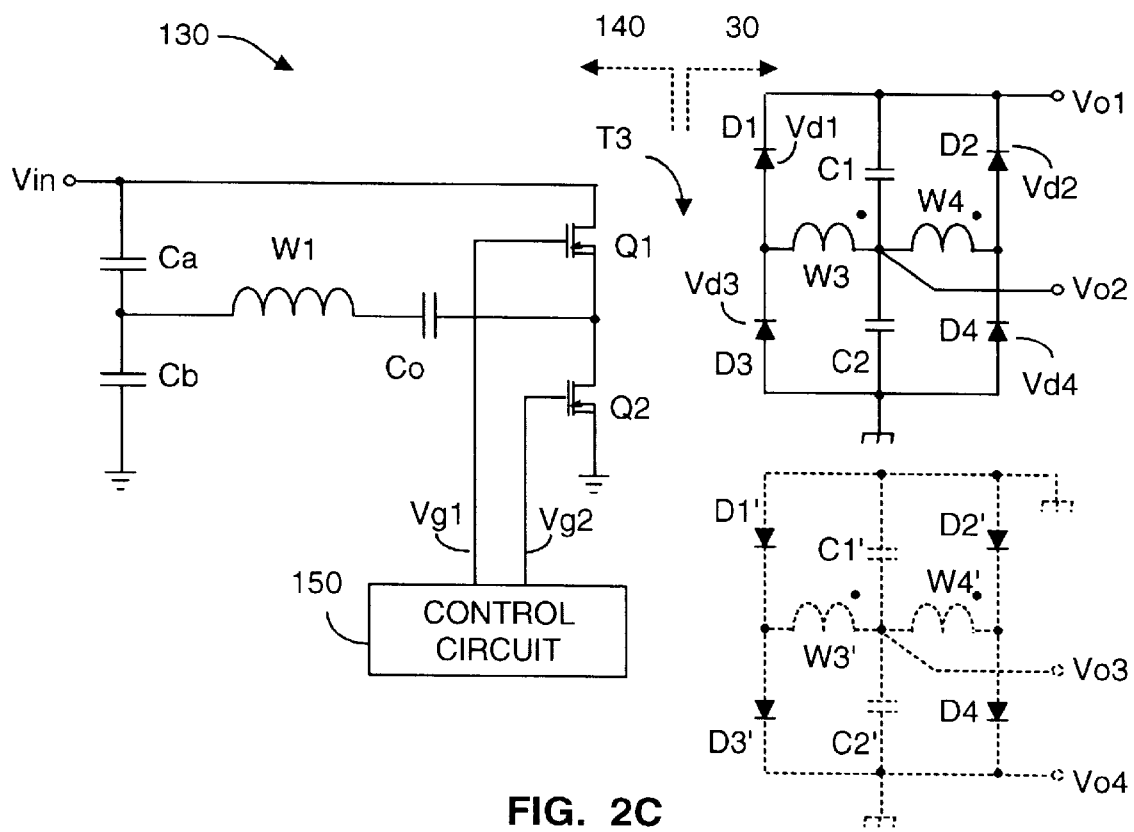
FIG. 2C depicts an alternative embodiment of the present invention showing a half-bridge input side converter configuration, with the improved output side configuration of FIG. 2A.

As shown by FIG. 2C, the above-described output side topology (denoted generally as 30) is not limited to use with a push-pull DC:DC converter, but may used with a converter of any input topology. In the example of FIG. 2C, a DC:DC converter 130 has an input side 130 that is a half-bridge configuration, and has an output side 30 whose topology is was described above. Transformer T3 comprises a primary winding W1, and secondary windings W3, W4, as described above. Primary winding W1 is coupled to input voltage Vin via switches Q1 and Q2 under command of a control circuit 150. It will be appreciated that for purposes of output side 30, it really matters not how switched voltages are created and presented to the secondary winding(s) of transformer T3. Indeed, the voltages need not be digitally switched but may be sinusoidal including samples of sinusoids, impulses, and so forth.

Figure 3:
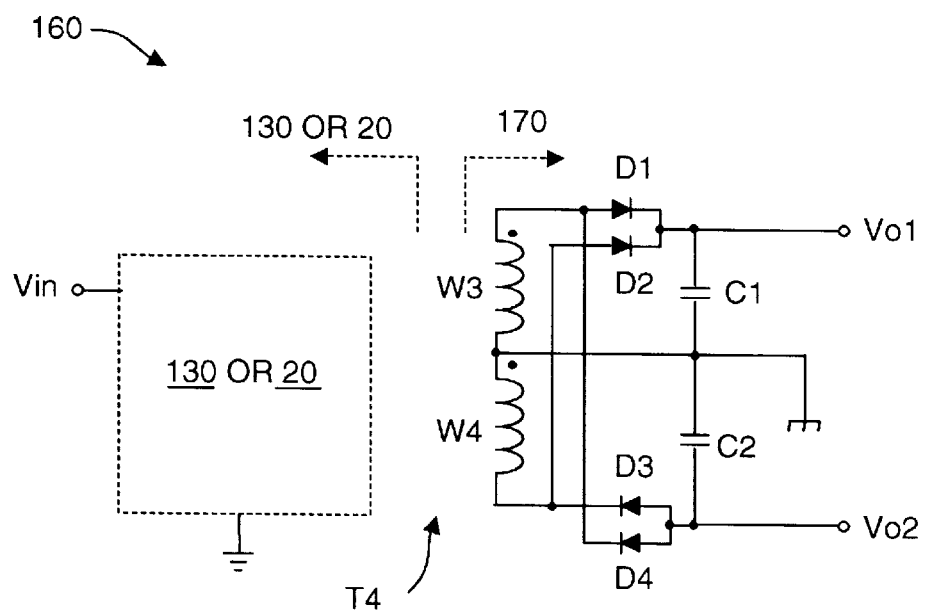

FIG. 3 depicts yet another embodiment of a DC:DC converter 160, whose input or primary side may be as was described with respect to elements 20 or 130, or indeed may be some other topology. Converter system 160 thus includes an input side, and a transformer T4 whose secondary windings are here denoted W3, W4, and an output side 170 that may be described as a half-bridge configuration.

Similar to what was described with respect to the output side configuration of FIG. 2A, full magnetic utilization of the secondary windings W3, W4 is made. As before, the secondary windings are never allowed to float, and are clamped to ground or to an output capacitor, here C1 or C2. In the configuration shown, different polarities Vo1, Vo2 are readily obtained relative to output ground, e.g., Vo1 is positive and Vo2≈−Vo1. Other polarity configurations are possible. For example, the C1–C2 junction could be ungrounded and used to output Vo2, whereas the junction of C1, D3, D4 would be grounded. This configuration would output two voltages of like polarity, Vo1, and Vo2≈0.5·Vo1.

Note that output capacitors C1 and C2 are advantageously series-coupled, which distributes voltage stress and enables lower voltage rated capacitors to be used, relative to prior art output side configurations. In contrast to prior art configurations, the secondary windings need not be center-tapped, which eases fabrication of T4 and can reduce manufacturing cost. Note too that snubbers are not required, which implies that converter 160 does not sacrifice the typically 5% in conversion efficiency associated with the presence of snubbers.

To recapitulate what has been described herein, the present invention provides current-fed emulating input side topology 20 that may be used with any output side topology, including prior art output topologies. As was described with respect to FIG. 2A, this aspect of the invention advantageously replaces active components, e.g., input switch Qo, input diode Do, filter capacitor Co, with a passive inductor Ls that averages or smoothes input current.

Regardless of whether this input side topology is used, the invention also provides several output side topologies that may be used with any input configuration. The output side topologies advantageously make 100% utilization of secondary transformer windings, to reduce EMI and over-voltage stress, and are preferably used without snubbers. Further, the transformer secondary windings do not require center-tapping, and the topologies advantageously series-couple output capacitors. The series-coupled output capacitors enjoy reduced stress voltage, and the resultant topology advantageously creates a second output voltage that may be half the primary output voltage, or a negative polarity version of the primary output voltage.

Modifications and variations may be made to the disclosed embodiments without departing from the subject and spirit of the invention as defined by the following claims.

What is claimed is:

1. A DC:DC converter having an input node coupleable to a source of operating Vin potential, and at least a Vo1 output node, the converter comprising:
   a transformer including a first primary winding, a second primary winding, and at least a first secondary winding;
   means for selectively switching said Vin potential across said first primary winding and across said second primary winding such that time periods are permitted having a characteristic selected from a group consisting of (a) time periods during which neither primary winding is coupled to said Vin potential, and (b) overlapping time periods during which both primary windings are coupled to said Vin potential;
   an inductor coupled in series between a source of said Vin and a first node of said first primary winding and a first node of said second primary winding; and
   means for rectifying switched potential appearing across said secondary winding to provide said Vo1 at said output port.

2. The DC:DC converter of claim 1,
   further including a diode coupled in parallel across said inductor.

3. The DC:DC converter of claim 1, further including a second secondary winding series coupled to said first secondary winding, a junction therebetween defining a Vo2 node; wherein:
   said first secondary winding and said second secondary winding are coupled to said means for rectifying such that each said secondary winding conducts current at all times.

4. The DC:DC converter of claim 3, wherein said means for rectifying is coupled to said first secondary winding and to said second secondary winding to provide potential at said Vo1 node and at said Vo2 node having a characteristic selected from a group consisting of (a) Vo2≈0.5·Vo1, and (b) Vo2≈−Vo1.

5. The DC:DC converter of claim 1, further including a second secondary winding series coupled to said first secondary winding, a junction therebetween defining a Vo2 node; wherein:
   said means for rectifying includes:
      first and second series-coupled capacitors coupled between said Vo1output node and a ground node, a junction between said capacitors coupled to said Vo2 node; and
      a four diode bridge coupled between said Vo1 node, said ground node, an end of said first secondary winding, and an end of said second secondary winding.

6. The DC:DC converter of claim 5, wherein:
   said Vo2 node outputs a potential Vo2≈0.5·Vo1.

7. A DC:DC converter coupleable to a source of Vin potential to output a Vo1 potential at a Vo1 output node, comprising:
   a transformer having at least one primary winding switchably coupleable to said source of Vin potential, and having at least a first secondary winding and a second secondary winding;
   means for rectifying coupled to said first secondary winding, to said second secondary winding, and to said Vo1 output node such that each said secondary winding conducts current at all times.

8. The DC:DC converter of claim 7, wherein:
   said means for rectifying includes a first capacitor series-coupled to a second capacitor, a junction therebetween defining a Vo2 output node;
   said means for rectifying is coupled to said first secondary winding, to said second secondary winding, and to said Vo1 output node such that a potential Vo2≈0.5·Vo1 is generated at said Vo2 output node.

9. The DC:DC converter of claim 7, wherein:
   said means for rectifying includes a first capacitor series-coupled to a second capacitor, a junction therebetween defining a Vo2 output node;
   said means for rectifying is coupled to said first secondary winding, to said second secondary winding, and to said Vo1 output node such that a potential Vo2≈−Vo1 is generated at said Vo2 output node.

10. The DC:DC converter of claim 7, wherein:
    said first secondary winding is series-coupled to said second secondary winding, a junction therebetween defining an intermediate node; and
    said means for rectifying includes:
       first and second series-coupled capacitors coupled between said Vo1output node and a ground node, a junction between said capacitors coupled to said intermediate node; and
       a four diode bridge coupled between said Vo1 node, a second node, an end of said first secondary winding, and an end of said second secondary winding.

11. The DC:DC converter of claim 10, wherein:
    said second node is grounded, and a potential Vo2≈0.5·Vo1 is generated at said intermediate node.

12. The DC:DC converter of claim 10, wherein:
    said intermediate node is grounded; and
    said second node is a Vo2 output node, wherein a potential Vo2≈−Vo1is generated at said Vo2 output node.

13. The DC:DC converter of claim 7, wherein said primary winding is part of a push-pull input configuration.

14. The DC:DC converter of claim 7, wherein said primary winding is part of a feed forward configuration.

15. A method of emulating a current fed input topology in a DC:DC converter having an input node coupleable to a source of operating Vin potential, a Vo1 output node, a transformer having at least one primary winding selectively coupleable to a source of said Vin potential, and having at least one secondary winding coupled to a rectifier circuit outputting a Vo1 potential at said Vo1 output node, the method comprising:
    coupling an inductor in series between said source of said Vin a non-switched node of each primary winding.

16. A method of operating a DC:DC converter to reduce EMI, the DC:DC converter having an input node coupleable to a source of operating Vin potential, a Vo1 output node, a transformer having at least one primary winding selectively coupleable to a source of said Vin potential, and having at least a first secondary winding and a second secondary winding, the method comprising:
    coupling a rectifier circuit to said first secondary winding, to said second secondary winding, and to said Vo1 output node such that each said secondary winding conducts current at all times.

17. The method of claim 16, wherein coupling said rectifier circuit includes series-coupling a first capacitor to a second capacitor, a junction therebetween defining a Vo2 output node;
    said means for rectifying being coupled such that a potential Vo2≈0.5·Vo1 is generated at said Vo2 output node.

18. The method of claim 16, wherein coupling said rectifier circuit includes series-coupling first capacitor to a second capacitor, a junction therebetween defining a Vo2 output node;

said means for rectifying being coupled such that a potential Vo2≈−Vo1 is generated at said Vo2 output node.

19. The method of claim 16, wherein an input side of said DC:DC converter is operated in a push-pull configuration.

20. The method of claim 16, wherein an input side of said DC:DC converter is operated in a feedforward configuration.

* * * * *